United States Patent Office 3,585,716
Patented June 22, 1971

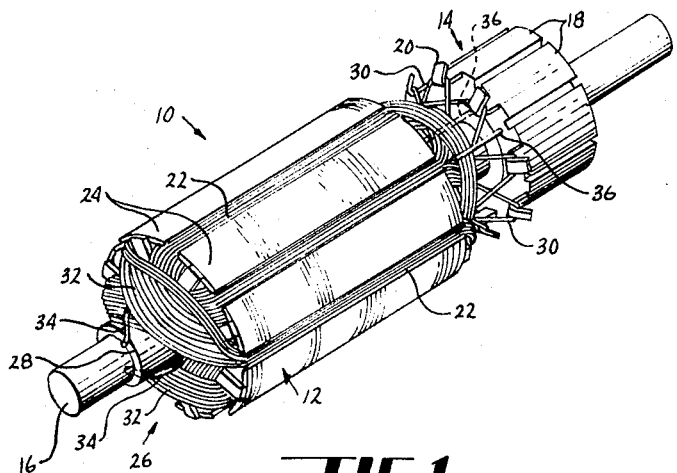
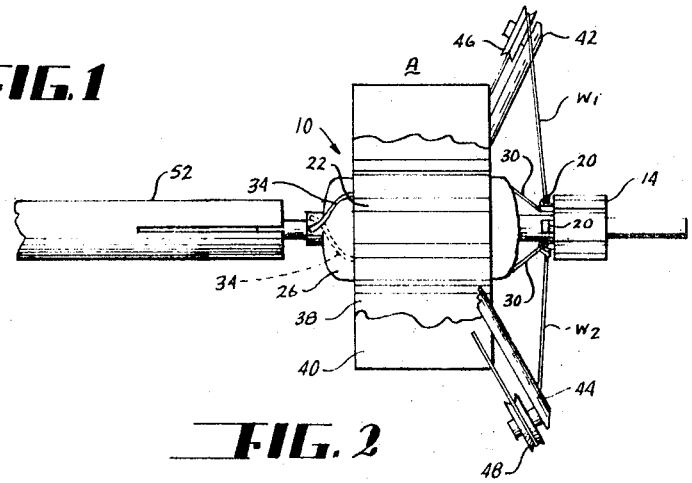
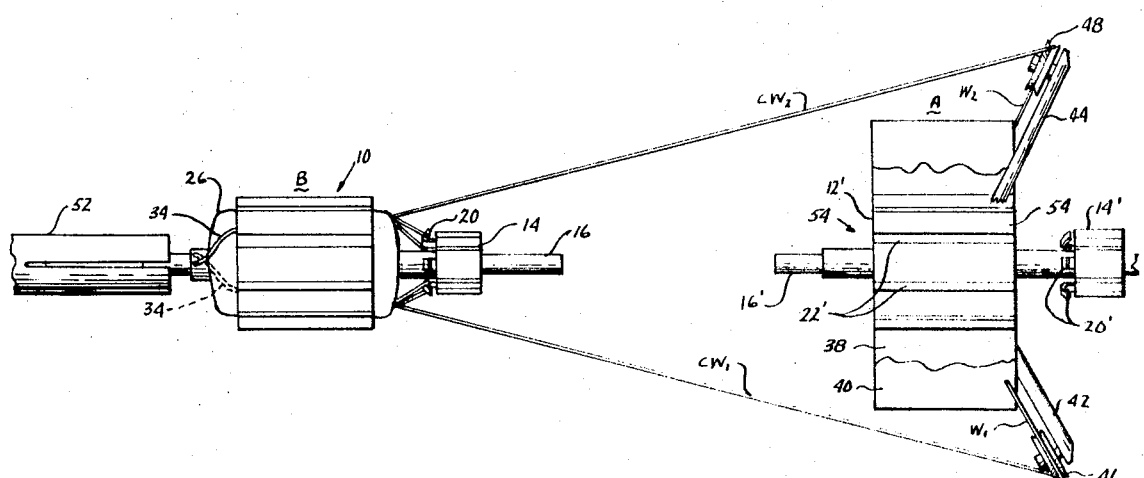

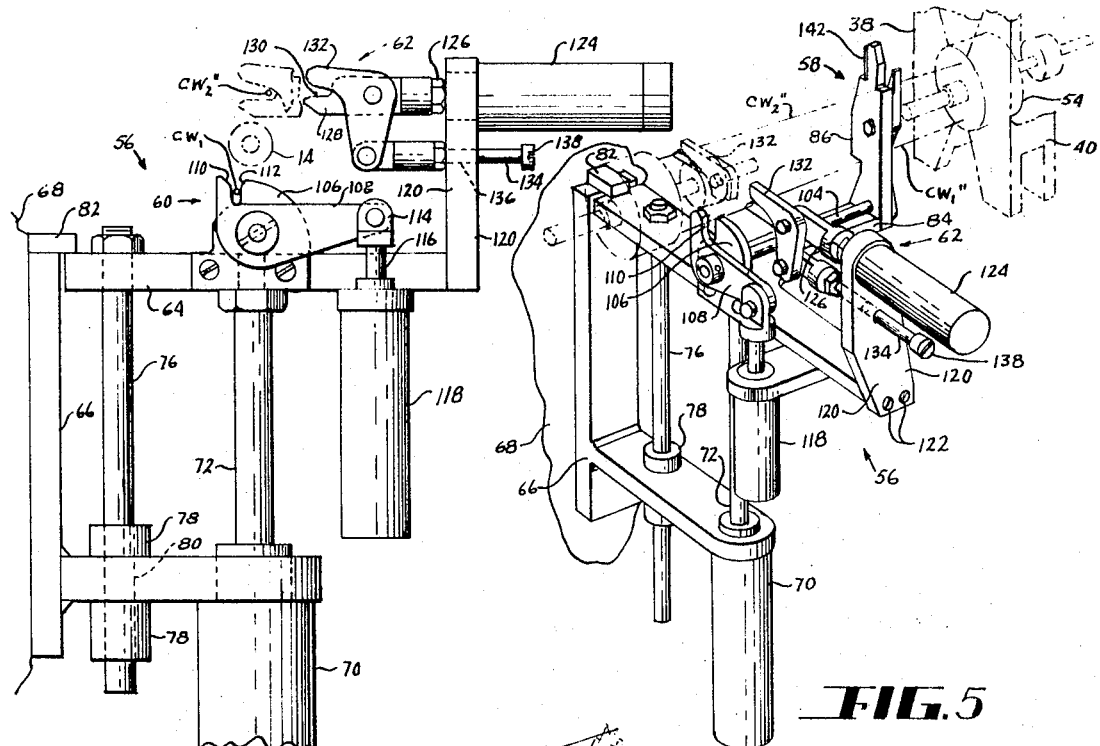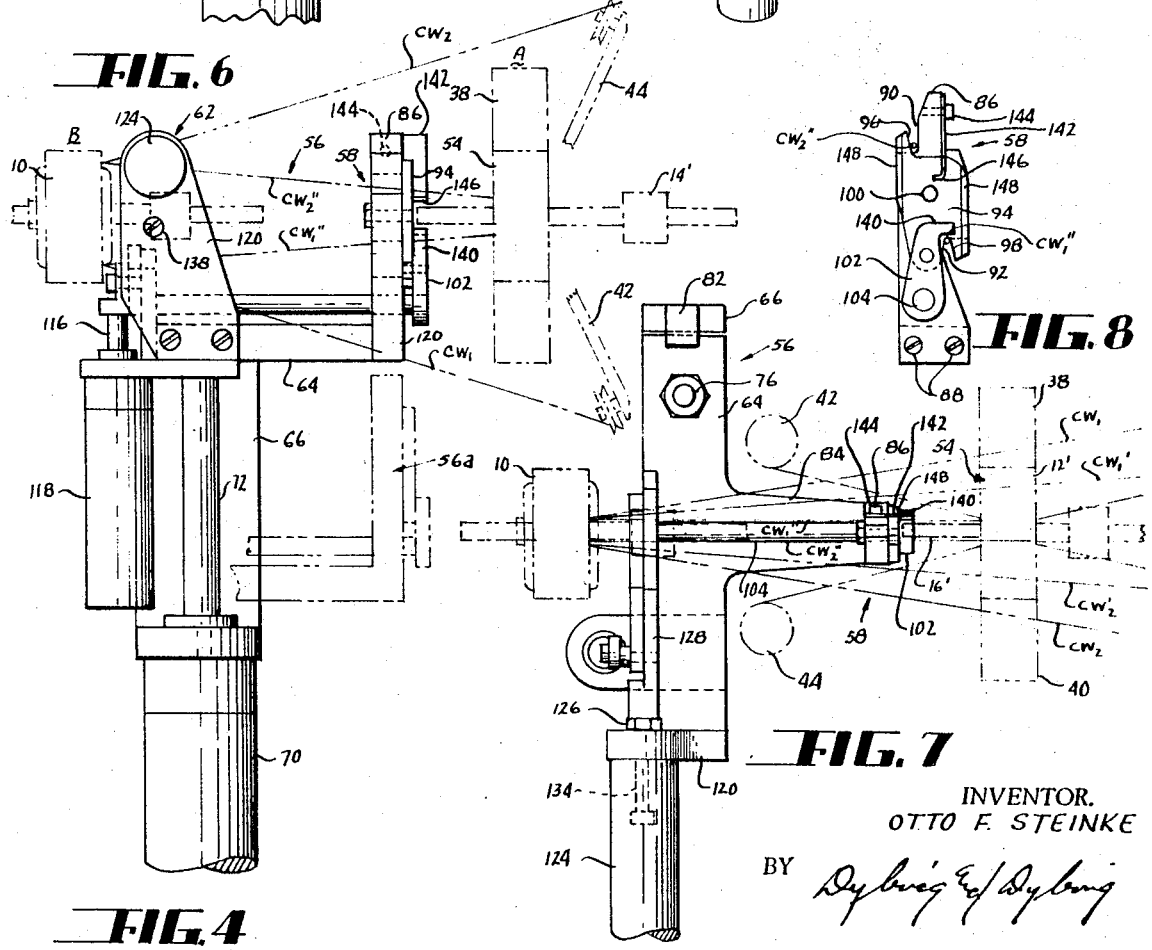

3,585,716
METHOD OF AUTOMATICALLY WINDING ARMATURES
Otto F. Steinke, Dayton, Ohio, assignor to The Globe Tool and Engineering Company, Dayton, Ohio
Filed Aug. 1, 1968, Ser. No. 749,381
Int. Cl. H01r 43/00
U.S. Cl. 29—597                    3 Claims

ABSTRACT OF THE DISCLOSURE

In the automatic winding of successive armatures by double flier winding machines, wasted wire is minimized and the subsequent handling of the wound armatures is simplified by cutting out sections of the wires connected between wound and unwound armatures and closely adjacent the two armatures. The cutter assembly cuts both connecting wires in two places simultaneously, the wires being moved into the operative path of the cutter mechanisms by rotation of the fliers.

---

This invention relates to automatic armature winding and more particularly to a method and apparatus for cutting lengths of wire between successively wound armatures.

Modern fully automatic armature winding machines include mechanism for automatically loading unwound armatures at a winding station as well as mechanism for unloading the fully wound armatures from the winding station. At the winding station the armatures are fully wound with the lead wires between the armature coils being at least partially connected to the commutator segments. When a wound armature is unloaded from the winding station of a double flier armature winding machine, the wires leading from the last pair of lead wires to the fliers will remain connected to the fully wound armature as the unwound armature replaced thereby is being wound unless some provision is made for cutting these lengths of wire.

There are several problems connected with the present day practice. In the winding of armatures having commutators with hook-shaped tangs, it is frequently desired to use the unloading mechanism as a transfer mechanism for inserting the wound armature into a hot staking device which burns the insulation from the wire and permanently connects the uninsulated wire to the commutator tangs. The cut ends of the wires, called finish wires, remaining connected to the commutator may interfere with the handling of the armature at the hot staking device. The cut ends of the wires, called start wires, leading to the armature being wound are typically so long that they may bend into the paths of the wire between the armature being wound and the fliers, thus interfering with the continued winding of the armature. Also, it has been the practice to move the wound armature from the winding station by a distance sufficient to separate it from the unwound armature to permit the cutting of the wire to take place outside of the paths of movement of the fliers and the wire guided thereby. As a result, the ends of the wires adjacent both ends of the wound armatures have to be carefully trimmed away at a later stage in the processing of the armature. This practice also results in a considerable waste of wire which, in mass production, can be a significant expense.

An object of this invention is to provide an improved method and apparatus for cutting the connecting wires between successively wound armatures during the automatic winding of the armatures. In accordance with this invention the connecting wires are cut closely adjacent the shaft of the armature being wound with the result that the length of wasted wire strands between the armatures is reduced and the further result that the start wires are cut sufficiently short that they need not later be trimmed away as has been usual in the past. Also, the cut ends of the start wires do not interfere with the continued winding of the armature.

Another object of this invention is to provide a cutter mechanism for cutting the connecting wires between armatures closely adjacent the commutator tangs of the fully wound armature immediately after it is wound and before further finishing of the armature. As a result, the finish wires do not interfere with the subsequent handling of the armature.

A further object of this invention is to cut the connecting wires in two different places so that sections thereof are cut out, whereupon they drop away from the armature winding machine and may conveniently be collected.

Still another object of this invention is to provide a simple and positive cutter mechanism for simultaneously cutting both connecting wires at two points along their lengths without interfering with the unloading of the wound armatures and without interfering with the continued winding of the armaute being wound. This object is accomplished by providing a movable cutter assembly, the cutter assembly having a total of four movable cutting edges with two of the cutting edges being inserted between the paths formed by the wire in the winding of an armature at the winding station.

It is still another object of this invention to provide means for cutting the two connecting wires by a single knife blade having two cutting edges and driven by a shaft which rotates about an axis which is generally parallel to the connecting wires. The connecting wires are moved to a path for convenient cutting by the normal rotation of the fliers as part of the automatic winding cycle for winding the armature being wound.

Other objects and advantages will become apparent from the following description and the drawings in which:

FIG. 1 is a perspective view of an armature after the armature is fully wound and the finish wires severed in accordance with this invention;

FIG. 2 is a side elevational view illustrating an armature about to be removed or unloaded from a winding station of a double flier armature winding machine. Portions of the armature winding and commutator connections are simplified and not illustrated in order to more clearly illustrate the method of this invention;

FIG. 3 is a side elevational view similar to FIG. 2 in which the wound armature has been removed from the winding station to a cutting station in preparation for the cutting of the finish wires therefrom, and in which an unwound armature has been loaded in the winding station;

FIG. 4 is a side elevational view of a cutter assembly in accordance with this invention positioned to sever the wire between armatures located at the winding and the cutting stations;

FIG. 5 is a perspective view of the cutter assembly of FIG. 4;

FIG. 6 is a rear elevational view of the cutter assembly as viewed from the end thereof adjacent the fully wound armature;

FIG. 7 is a plan view of the cutter assembly; and

FIG. 8 is a front elevational view of a portion of the cutter assembly as viewed in the direction of arrows 8—8 of FIG. 4.

Referring to FIG. 1 in greater detail, an armature, generally designated 10, is illustrated of the type having a laminated core 12 and a commutator 14 mounted on an armature shaft 16. The commutator 14 has a plurality of circumferentially spaced commutator segments 18 terminating in hook-shaped tangs 20 adjacent one end of the laminated core 12. The core 12 has a plurality of radially extending slots 22 separated by T-shaped teeth 24 which receive a coil winding 26. As well known, armatures of this type have appropriate insulating members to prevent electrical contact between the winding 26 and the other parts of the armature 10 such as, for example, the insulating sleeve 28 mounted on the armature shaft 16 adjacent the core 12 opposite the commutator 14. When the armature 10 is assembled with the parts of a complete motor, a portion of the armature shaft 16 projecting beyond the sleeve 28 is journalled for rotation in a bearing (not shown).

The winding pattern for the armature 10 illustrated in FIG. 1 is known in the art as an "automotive" pattern and is commonly used in a variety of applications by the automotive industry. This winding pattern may be identical to the winding pattern more fully described in U.S. Pat. No. 2,306,855, issued to Ernest C. Allen on Dec. 29, 1942. This winding pattern readily lends itself to automatic winding by the use of double flier armature winding machines wherein pairs of coils are simultaneously wound by the two fliers with one-half the total number of coils wound being wound from a single length of wire and the other half being wound from another single length of wire. The lead wire connections, designated 30, between the individual coils 32 forming the winding 26 are coursed over the commutator tangs 20 as the winding of the coils 32 progresses. Also shown in FIG. 1 are the cut ends of the two lengths of wire. Thus, there are two wire ends 34, called "start wires," lying closely adjacent the end of the armature shaft opposite the commutator 14 and two wire ends 36, called "finish wires" cut close to the end face of the commutator 14 from which the tangs 20 project. The start wires 34 are sufficiently short that they do not overlie the journal portion of the armature shaft 16.

Referring to FIG. 2, an armature being wound by a double flier armature winding machine is supported between a pair of chucks or wire guide members 38 and 40 (see FIG. 5) at a winding station designated A. The rotating fliers used in winding the coils 32 are designated 42 and 44. These fliers terminate in wire guide pulleys 46 and 48, respectively, over which the wires, designated $W_1$ and $W_2$, are coursed. As known to those skilled in the art, the wires $W_1$ and $W_2$ progress from the wire guide pulleys 46 and 48 back through rotating spindles (not shown) to wire supplies and suitable tensioning devices (not shown) so that the wires $W_1$ and $W_2$ are, as the fliers 42 and 44 rotate, drawn under tension from the wire supplies.

The first step in the automatic winding procedure is the hooking of the start wires 34 to spaced commutator tangs 20. In modern automatic armature winding machines the tangs 20 may be shielded during most of the automatic cycle, the shield (not shown) being removed when it is desired to cause the wires leading from the fliers to be hooked over the tangs. After the start wires 34 are hooked to the spaced tangs 20, the fliers 42 and 44 are rotated to lay a pair of coils 32 into pairs of spaced slots 22. At the completion of the winding of the first and each subsequent pair of coils, additional commutator connections are made and the armature indexed about its longitudinal axis to present other pairs of slots 22 to receive coils of wire. Depending upon the winding pattern, the armature may be indexed either before or after the commutator connections 30 are made. The foregoing procedure continues until the armature is fully wound and all lead wire connections 30 have been made. The aforementioned Allen patent, No. 2,306,855, discloses the use of a fixed shield in a partially automatic armature winding machine. A more recent patent showing a flier drive for a fully automatic double flier armature winding machine is U.S. Pat. No. 3,371,483, issued to Robert C. Gray et al. on Mar. 5, 1968. Pat. No. 3,231,206, issued to Harry W. Moore, on Jan. 25, 1966, shows a movable shield or sleeve, designated 40 therein, which is moved from tang shielding to unshielding positions in an automatic armature winding machine. The winding procedure, as described above, is conventional and forms no part of this invention, and those skilled in the art will recognize that this invention could be used to advantage in other winding procedures, such as, for example, those disclosed in the aforementioned Moore Pat. No. 3,231,206.

FIG. 2 shows the position of the fliers 42 and 44 after the last lead wire connections 30 have been made and after all coils 32 forming the windings 26 have been wound. In FIG. 2 all but the final lead wires 30 have been omitted to better illustrate the paths of the wires $W_1$ and $W_2$. While the fully wound armature 10 is still at the winding station A, both fliers 42 and 44 are rotated in accordance with this invention to lay additional lengths of wire into pairs of spaced slots 22. The total rotation of the fliers at this time is less than 360° so that, in a side elevational view, the fliers 42 and 44 appear to change positions. The changed positions of the fliers 42 and 44 can be understood by a comparison of FIGS. 2 and 3. After this added flier rotation, the fully wound armature 10 is moved from the winding station A to a cutting station, designated B, as illustrated in FIG. 3, by an unloading or transfer mechanism including a chuck 52 which grips the end of the armature shaft 16 opposite from the commutator 14. An unwound armature, such as that designated 54 in FIG. 3, is then moved to the winding station A between the chucks 38 and 40 while the lengths of wire leading from the wound armature 10 to the fliers 42 and 44, respectively, remain uncut. Because these lengths of wire will temporarily connect the successively wound armatures 10 and 54, they are termed "connecting wires" herein and identified by the reference characters $CW_1$ and $CW_2$. The automatic loading and unloading apparatus for advancing armatures to and from the winding station A may take any conventional form and thus are not illustrated in detail herein. During the cutting operation to be described below, the wound armature 10 is preferably held at the cutting station B by the chuck 52 but it is apparent that other devices could be used for this purpose.

The winding method in accordance with this invention continues as follows. After the armatures are positioned as illustrated in FIG. 2 and before any turns of wire are wound into the unwound armature 54, a cutter assembly, generally designated 56, which is described in detail below is, as illustrated in FIG. 4, moved to a position between the armatures 10 and 54. The fliers 42 and 44 are then rotated first to hook parts of the wire portions $CW_1$ and $CW_2$ to spaced commutator tangs 20' of the commutator, designated 14', of the unwound armature 54 and then to wind the first turns of wire of the first pair of coils in the unwound armature 54. As the fliers 42 and 44 commence rotating, the connecting wires $W_1$ and $W_2$ are drawn into the paths of movement of a double cutter mechanism 58 adjacent the unwound armature 54 and two single cutter mechanisms 60 and 62 adjacent the commutator 14 of the wound armature 10.

After a few turns have been wound in the unwound armature 54 the wires are effectively clamped thereto. Accordingly, it is then possible to cut the connecting wires $CW_1$ and $CW_2$ as the fliers 42 and 44 continue to rotate. The cutter mechanisms 58, 60 and 62 are simultaneously actuated to cut the wires $CW_1$ and $CW_2$ adjacent the commutator tangs of the wound armature 10 and as close to the end of the armature shaft 16' opposite the commutator 14' of the unwound armature 54 as possible. The severed lengths of connecting wire between the spaced points at which they are cut drop away from the cutter area. The remaining lengths of the connecting wires adjacent the wound armature 10 form the finish wires 36 which will, at some later point, be stripped from the wound armature 10. The lengths of start wires 34 remaining adjacent the shaft of the unwound armature 54 are cut sufficiently short and close to the armature core 12' for the flexibility or resiliency thereof that they remain closely adjacent to its armature shaft 16' and, due to the subsequent winding of coils thereover, will be partially collapsed or folded under the coils. As will be described below, the start wires 34 may be guided into a spiral path about the armature shaft as the winding progresses. In any event, they remain out of the winding paths and do not, therefore, interfere with the continued winding of the armature 54. When an armature is fully wound, the start wires are sufficiently close to the armature core that they would not interfere with the armature 10 during its operation in a motor and, therefore, need not be cut again.

Referring to FIGS. 4 through 8, the cutter assembly 56 includes a cutter support plate 64 mounted for vertical movement with respect to a bracket 66 supported on a fixed support 68. The bracket 66 is generally L-shaped and has supported thereon a vertically mounted fluid operated cutter positioning cylinder 70 having an upwardly projecting piston rod 72 connected to the cutter support plate 64. A vertically extending guide rod 76 connected to the support plate 64 passes through bushings 78 and an aperture 80 in the leg of the L-shaped bracket 66. The entire cutter assembly 56 is movable from a lower position, as indicated by the phantom lines 56a in FIG. 4, to an upper position as shown in full lines in FIG. 4, as well as in FIGS. 5 and 6, by operation of the cutter positioning cylinder 70, the cutter assembly 56 being guided in this movement by the guide rod 76. The upper position of the cutter assembly 56 is determined by suitable stops (not shown) associated with the cylinder 70 itself as well as a flange abutment 82 mounted on top of the L-shaped bracket 66.

As best seen in FIG. 7, the cutter support plate 64 is generally T-shaped and has a narrow leg portion 84 terminating closely adjacent the end of the armature shaft 16' located at the winding station A. The aforementioned double cutter mechanism 58 includes a narrow, upwardly extending fixed cutter plate 86 mounted as by screws 88 on the end edge of the narrow support plate leg portion 84. The fixed cutter plate 86 has, as viewed from the winding station A (FIG. 8), an upper left side vertically extending cutting edge 90 and a lower right side vertically extending cutting edge 92. Cooperating with the fixed cutter plate 86 is a double edged knife blade 94 having left and right upper and lower vertically extending cutting edges 96 and 98, respectively, the knife blade 94 being mounted for rotation about a horizontal axis on the cutting plate 86 by a pivot pin 100. Pivotally connected to the bottom of the double edged knife blade 94 is a drive link 102 affixed to one end of a cutter drive rod 104 journalled for rotation in the fixed cutter plate 86.

The cutter drive rod 104 is also journalled for rotation within a vertically upright, fixed cutter plate 106 forming part of the single cutter mechanism 60 which is located in parallel relation to the double cutter mechanism 58 and at the center of the head of the T-shaped support plate 64. The single cutter mechanism 60 further includes a knife blade 108 affixed to the cutter drive rod 104 and having a vertical cutting edge 110 (FIG. 6) cooperating with the vertically extending cutting edge 112 of the associated fixed cutter plate 106. The knife blade 108 is generally in a shape of a bell crank and has a horizontally projecting portion connected by a fitting 114 to a piston rod 116 of a fluid operated cutter drive cylinder 118. As apparent, if the piston rod 116 of the cutter drive cylinder 118 is moved vertically downwardly, the bell crank shaped knife blade 108 will be rotated in a clockwise direction as viewed in FIG. 6 and, simultaneously, the double edged knife blade 94 of the double cutting mechanism 58 will be similarly rotated.

The single cutter mechanism 62 is mounted upon an upwardly projecting bracket 120 connected as by screws 122 to an end edge of the head of the T-shaped support plate 64. This last mentioned cutter mechanism 62 includes a horizontally oriented, fluid operated cutter drive cylinder 124 having a piston rod affixed by a fitting 126 to a horizontal cutter plate 128 having a horizontally extending cutting edge 130 (FIG. 6). Pivotally mounted on the horizontal cutter plate 128 is a knife blade 132 which is also shaped as a bell crank lever. A vertically depending portion of the knife blade 132 is connected to a horizontally oriented guide rod 134 projecting through an aperture 136 in the bracket 130 and which has an enlarged head 138. As apparent from FIG. 6, when the horizontally oriented cutter drive cylinder 124 is energized to extend the cutter plate 128 and the knife blade 132 to the left, the enlarged head 138 will abut the confronting face of the bracket 120, causing the bell crank shaped knife blade 132 to be pivoted on the fixed cutter plate 128 to sever wire trapped between the knife edges thereof. Conventional machine controls are used to cause simultaneous operation of the two cutter drive cylinders 118 and 124. None of the machine timing controls have been illustrated herein, it being understood that such devices are old and well known.

The operation of the cutter assembly 56 is as follows. When the fully wound armature 10 is transferred from the winding station A to the cutting station B, the cutter assembly 56 is in its lower position indicated by the phantom lines 56a in FIG. 4. Immediately thereafter, the cutter assembly 56 is raised by operation of the cutter positioning cylinder 70 to its upper position. At this time the connecting wires leading from the wound armature 10 to the fliers 42 and 44 lie in a path indicated by the phantom lines $CW_1$ and $CW_2$ in FIGS. 3, 4 and 7. Note that in this position the wire strands are not located to be engaged by the three cutter mechanisms 58, 60 and 62. Before the wound armature 10 can be removed, the chucks or winding forms 38 and 40 are separated. These then are returned to the position shown in FIG. 5 after the unwound armature is positioned at the winding station A. Consequently, the connecting wires move to the position indicated by the phantom lines $CW_1'$ and $CW_2'$ in FIG. 7. As the flies 42 and 44 are then rotated to wind three or four turns of coils in pairs of slots 22' in the unwound armature 54, the connecting wires are moved closer to the shaft of the unwound armature 54 to the position indicated by the phantom lines $CW_1''$ and $CW_2''$, respectively, in FIGS. 4 and 7. Consequently, the connecting wires are brought into a position to be cut by the pivotal movement of the three knife blades 94, 108 and 132. This position of the connecting wires is also shown in cross section in FIGS. 6 and 8. At this time, the cutter drive cylinders 118 and 124 are energized, causing the connecting wires to be severed in two places, cutting out a section of each of them, which sections fall to the floor or into a suitable receptacle. The wound armature 10 can then be removed from the cutting station B for subsequent finishing operations.

In the cutter assembly shown in FIGS. 4 through 8, the pivot pin 100 for the double edged knife blade 94, when it is in the operative upper position, is coaxial with the longitudinal axis of the armature shafts 16 and 16' and the connecting wires $CW_1$ and $CW_2$ are cut as close to the adjacent end of the armature shaft 16' as possible. To obtain the desired result of avoiding the necessity of later cutting the start wires 34, it may be necessary to cut the connecting wires $CW_1$ and $CW_2$ even closer to the armature core 12' of the unwound armature 54. Also, to insure that the start wires 34 assume their desired positions with respect to the armature shaft 16', it may be necessary or desirable to provide suitable start wire guiding devices or "wire traps." Examples of the types of wire traps that may be used are illustrated in FIGS. 4, 7 and 8. Thus referring to FIG. 8, the drive link 102 has a hooked upper wire trap portion 140 closely adjacent to the cutting edge 98 and overlying the wire located at CW₁". Associated with the wire located at CW₂" is a wire trap 142 connected to the top of the double edged cutter plate 86 by a bolt 144. The wire trap 142 comprises a metal plate having a hook-shaped trap portion, designated 146, extending besides the cutting edge 90 and beneath the wire located at CW₂". As already mentioned, the unwound armature 54, as it is being wound, is indexed between the winding of pairs of coils. During these indexing steps, the cut ends of the start wires 34 are restrained. As a result, the start wires 34 are guided by the wire trap portions 140 and 146 into the spiral paths indicated in FIGS. 1, 2 and 3. Successively wound coils will overlie the start wires 34 and further tend to hold and guide them in their spiral paths so that the start wires 34 of the completed armature, such as that designated 10 in FIG. 1, will not overlie any part of the journal portion of the associated armature shaft. If desired, the start wires 34 can, during subsequent handling of the armature, be bent to lie against the winding 26. The cutter assembly 56 can be left in its upper position as the winding of the unwound armature 54 progresses, provided it is lowered in advance of the operation of the transfer mechanism including the chuck 52.

It will be observed that the narrow leg portion 84 of the support plate 64 extends between the generally conical paths of the wire leading from the fliers 42 and 44 to the unwound armature 54 and thus does not interfere with the operation of the fliers 42 and 44. To minimize the separation between the unwound armature 54 and the adjacent cutter assembly 56, the side edges of the double edged knife blade 94 may be beveled as indicated at 148 in FIGS. 7 and 8.

Using the cutter assembly 56 and the method described above, this invention has been successfully practiced with a total saving of wire between successively wound armatures of eleven inches. As already mentioned, it is unnecessary to again cut the wire adjacent the end of a wound armature opposite its commutator. The excess wire remaining attached to the commutator 14 does not interfere with the subsequent handling or finishing operations and can be away at any convenient time. Since the cutting of the wires between successively wound armatures also does not interfere with the operation of the fliers 42 and 44 or in any other way with the winding of the coils 32 or the hooking of the commutator lead connections 30, those skilled in the art will understand that this invention can be used in the winding of armatures having patterns different from that illustrated in FIG. 1. In most if not all cases, the connecting wires should be cut during the winding of the first pairs of coils in an armature located at the winding station A and before it has been indexed.

Having thus described my invention, I claim:

1. In a method of automatically winding armatures wherein armatures are wound and lead wire connections are formed at a winding station and a wound armature is removed from the winding station and replaced by an unwound armature, the winding of an unwound armature being started with a pair of connecting wires leading from a wound armature to slots in the unwound armature, the method of cutting the connecting wires between the wound armature and the unwound armature comprising the steps of cutting both connecting wires at spaced points adjacent the commutator tangs of the wound armature and adjacent the end of the shaft opposite the commutator of the unwound armature after a few turns having been wound into pairs of slots in the unwound armature.

2. The method of claim 1 wherein both connecting wires are cut at both spaced points simultaneously.

3. In a method of automatically winding armatures of the type having an armature core with coil receiving slots and a commutator having commutator tangs for lead connections, the armature core and the commutator being mounted on an armature shaft, the steps of completing the winding of the coils of a first armature at a winding station, removing the wound armature from the winding station, placing an unwound armature in the winding station, winding a few turns of wire by a pair of rotating fliers into pairs of slots of said unwound armature and cutting the portions of the wires used in winding the armatures connecting between the wound armature and the unwound armature closely adjacent the armature shafts of each said wound armature and said unwound armature.

References Cited

UNITED STATES PATENTS

| | | | |
|---|---|---|---|
| 2,779,886 | 1/1957 | Hunsdorf | 242—7.05X |
| 2,947,427 | 8/1960 | Moore | 29—205X |
| 3,163,921 | 1/1965 | Applegate | 242—7.05X |
| 3,455,009 | 7/1969 | Moore | 29—205 |
| 3,474,515 | 10/1969 | Dammar | 29—605X |

JOHN F. CAMPBELL, Primary Examiner

C. E. HALL, Assistant Examiner

U.S. Cl. X.R.

29—205, 598, 605; 140—92.1; 242—7.05